United States Patent
Wang

(10) Patent No.: US 11,444,336 B2
(45) Date of Patent: Sep. 13, 2022

(54) ELECTRONIC DEVICE AND BATTERY MODULE

(71) Applicant: Lenovo (Beijing) Co., Ltd., Beijing (CN)

(72) Inventor: Tingting Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 155 days.

(21) Appl. No.: 16/913,718

(22) Filed: Jun. 26, 2020

(65) Prior Publication Data

US 2020/0411911 A1 Dec. 31, 2020

(30) Foreign Application Priority Data

Jun. 28, 2019 (CN) .......................... 201910580435.0

(51) Int. Cl.
| | |
|---|---|
| H01M 10/46 | (2006.01) |
| H01M 10/42 | (2006.01) |
| H02J 50/10 | (2016.01) |
| H01M 50/10 | (2021.01) |
| H01M 10/44 | (2006.01) |
| H02J 7/00 | (2006.01) |
| H02J 7/06 | (2006.01) |
| H04M 1/02 | (2006.01) |

(52) U.S. Cl.
CPC .......... *H01M 10/425* (2013.01); *H01M 10/44* (2013.01); *H01M 50/10* (2021.01); *H02J 7/0042* (2013.01); *H02J 7/06* (2013.01); *H02J 50/10* (2016.02); *H04M 1/0262* (2013.01); *H01M 2220/30* (2013.01)

(58) Field of Classification Search
CPC .......... H02J 7/0042; H02J 7/06; H02J 50/005; H02J 50/10; H01M 10/425; H01M 2220/30; H01M 2010/4271; H01M 50/10; H01M 10/44; H01M 10/46; H04M 1/0262
USPC .......................... 320/107, 108, 112, 114, 115
See application file for complete search history.

(56) References Cited

U.S. PATENT DOCUMENTS

2011/0009824 A1 * 1/2011 Yodfat ................ A61M 5/1723
604/151

FOREIGN PATENT DOCUMENTS

WO WO-2018191390 A1 * 10/2018 .............. H02J 50/10

* cited by examiner

*Primary Examiner* — Edward Tso
(74) *Attorney, Agent, or Firm* — Anova Law Group, PLLC

(57) ABSTRACT

An electronic device includes a device housing having a first receiving cavity, a function module at least partially located in the first receiving cavity, and a battery module located in the first receiving cavity. The battery module includes a battery casing that forms a second receiving cavity, a battery component located in the second receiving cavity, and a charging component located in the second receiving cavity. The battery component is configured to store electrical energy or release the stored electrical energy. The charging component is connected to the battery component and configured to charge the battery component through transmission of a wireless signal with a power supply device.

15 Claims, 4 Drawing Sheets

ELECTRONIC DEVICE AND BATTERY MODULE

CROSS-REFERENCE TO RELATED DISCLOSURE

The present disclosure claims the priority to Chinese Patent Disclosure Nos. 201910580435.0, entitled "Electronic Device and Battery Module", filed on Jun. 28, 2019, the entire content of which is incorporated herein by reference.

TECHNICAL FIELD

The present disclosure relates to the field of electronic technology, and in particular relates to an electronic device and battery module.

BACKGROUND

Wireless charging technology is a technology that uses wireless signals to charge the battery. With the development of wireless charging technology, more and more electronic devices have introduced wireless charging modules. However, a bottleneck of the wireless charging technology may be how to successfully introduce wireless charging modules into existing electronic device while reducing interference with the existing structure of the electronic device as much as possible to improve the compatibility of the existing structure of the wireless charging module with the electronic device.

SUMMARY

According to one aspect of the present disclosure, an electronic device is provided. The electronic device includes a device housing having a first receiving cavity, a function module at least partially located in the first receiving cavity, and a battery module located in the first receiving cavity. The battery module includes a battery casing that forms a second receiving cavity, a battery component located in the second receiving cavity, and a charging component located in the second receiving cavity. The battery component is configured to store electrical energy or release the stored electrical energy. The charging component is connected to the battery component and configured to charge the battery component through transmission of a wireless signal with a power supply device.

According to another aspect of the present disclosure, a battery module is provided. The battery module includes a battery component configured to store electrical energy or release the stored electrical energy, and a charging component. The charging component is connected to the battery component and configured to charge the battery component through transmission of a wireless signal with a power supply device. The battery module has at least two thicknesses in a stacking direction of the battery component and the charging component.

DETAILED DESCRIPTION OF THE EMBODIMENTS

The technical solution of the present disclosure will be further described below with reference to the drawings and specific embodiments.

Figure 1:
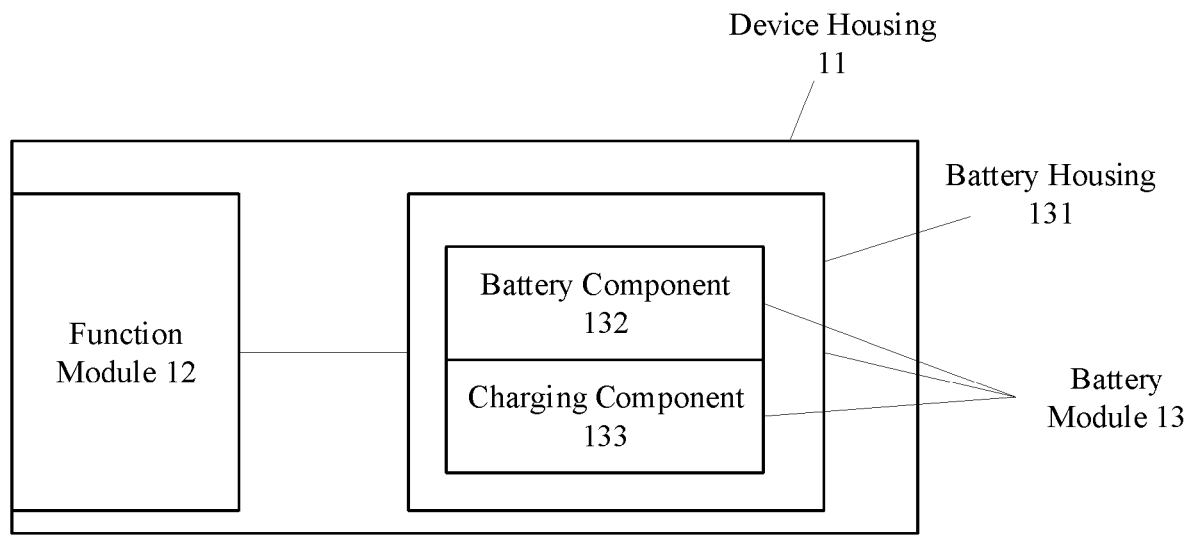
FIG. 1 is a schematic structural diagram of an electronic device according to an embodiment of the present disclosure.

As shown in FIG. 1, this embodiment provides an electronic device, including: a device housing 11 formed with a first receiving cavity; a function module 12 at least partially located in the first receiving cavity, the function module 12 referring to the portion of the electronic device that performs its main function (e.g., the computing module for a laptop or for a smartphone); a battery module 13 located in the first receiving cavity. The battery module 13 includes: a battery casing 131 that forms a second receiving cavity; a battery component 132 located in the second receiving cavity, being configured to store electrical energy or release the stored electrical energy; and a charging component 133 located in the second receiving cavity, being connected to the battery component 132 and being configured to charge the battery component 132 through wireless signal transmission with a power supply device.

This embodiment provides an electronic device. The electronic device may be various mobile devices such as a notebook computer, a tablet computer, a notebook and a tablet two-in-one computer, or a large-screen mobile phone.

In this embodiment, the device housing 11 included in the electronic device determines the visual effect of the overall appearance of the electronic device.

The device housing 11 forms a receiving cavity, which is considered the first receiving cavity, and can be used as the largest receiving cavity of the electronic device.

The function module 12 may be a module capable of implementing various functions, and energy consumption can be generated when achieving the functions. Such energy consumption may be provided by the power supply of the battery module 13.

The function module 12 includes, but is not limited to, at least one of the following:

Processor, including but not limited to: single-core or multi-core central processing unit (CPU), graphics processing unit (GPU), embedded controller (EC), microprocessor (e.g., a microcontroller unit (MCU)), or various programmable arrays, etc.;

Monitor, including but not limited to: liquid crystal display, electronic ink display, OLED display;

Sensor, including but not limited to: position sensors, or distance sensors;

Collector, including but not limited to: image collectors, or audio collectors; and Input module configured to collect user input, including but not limited to: keyboard, touchpad, touchscreen, fingerprint module, or pointing stick.

The keyboard may include: alphabetic keys, numeric keys, punctuation keys, and/or special keys that are capable of receiving characters, numbers, punctuation, or triggering special functions based on key operations. The touchpad can detect clicks and/or slides, thereby triggering the display, hiding, or moving of the mouse cursor of the electronic device. The fingerprint module can collect fingerprints. The pointing stick can also be an input module configured to adjust the cursor on the display screen based on user input. The input module includes, but is not limited to: dots embedded in the physical keyboard. The above description is only an example of the function module 12.

In some embodiments, the function module 12 is at least partially located in the first receiving cavity. For example, the processor and the like need not interact with the user, and a first type of the function module 12 for the user to view is completely located in the first receiving cavity. In another example, the monitor need to be viewed by the user, the first type of function module 12 of which the input module needs to be touched by the user, is partially located in the first receiving cavity, and another part can be displayed outside the electronic by disposing an opening at the first receiving cavity.

In this embodiment, the electronic device further includes a battery module 13. In this embodiment, the battery module 13 includes a battery component 132 composed of one or more battery cells, and a charging component 133 capable of charging the battery component 132.

In this embodiment, the charging component 133 can receive a wireless signal, convert the wireless signal into its internal electrical signal, and convert electromagnetic energy of the wireless signal into electrical energy to supply power to the battery component 132.

In this embodiment, the charging component 133 and the battery component 132 are both located in the second receiving cavity formed by the battery casing 131. Specifically, the charging component 133 and the battery component 132 are disposed adjacent to each other. For example, the charging component 133 is located outside the battery component 132, and further specifically, the charging component 133 is located on outer surface of the battery component 132. Accordingly, a distance between the charging component 133 and the battery component 132 of the battery module 13 can be limited, for example, less than a preset distance, less than a maximum distance that the second receiving cavity can provide, and so on.

In this embodiment, the battery casing 131 is an unshielded casing having no shielding effect on wireless signals, for example, a plastic casing, through which the wireless signal for charging can successfully pass.

In this embodiment, the charging component 133 can be charged based on the wireless signal. Accordingly, on the one hand, the replacement of the battery module can be convenient, and the electronic device that could not previously be charged based on the wireless signal can be simplified, to replace the battery module that cannot be charged based on the wireless signal with the battery module of the present disclosure, which can be charged based on the wireless signal, to achieve a simple replacement of the battery module in the electronic device.

On the other hand, the charging component is located in the battery casing of the battery module, and does not need to be disposed on the main board of the electronic device or occupy an area of the main board, which reduces the compatibility problem with the existing electronic device due to the disposition on the main board, and reduces redesign of the electronic device caused by re-adjusting the layout of the main board, or increasing the layout of the motherboard by re-adjusting the layout of the electronic device, thereby simplifying the upgrade of the electronic device.

Further, the charging component may not be disposed on the main board of the electronic device due to the phenomenon that the charging signal interferes with other circuits on the main board. Accordingly, battery interference (e.g., electromagnetic interference (EMI)), and/or radio frequency interference (RFI) caused by mutual interference phenomenon can be reduced. At the same time, since the charging component can generate heat during the charging process, and accordingly, it can be separated from the main board, which can reduce the phenomenon of heat accumulation on the main board caused by the charging component.

In some embodiments, the charging component 133 may include: a charging coil 1331 configured to induce the wireless signal and convert it into a charging signal, and charge the battery component 132 based on the charging signal.

Figure 3:
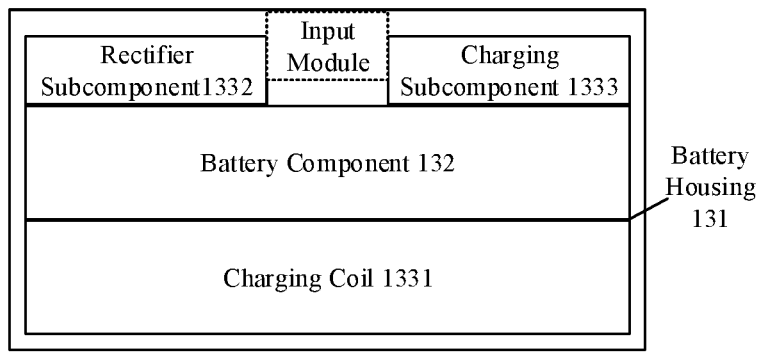
FIG. 3 is a schematic structural diagram of another electronic device according to an embodiment of the present disclosure.

As shown in FIG. 3, the function module 12 may include an input module. The input module includes an input collection area, which is displayed on the outer surface of the electronic device through the opening formed on the first surface of the device housing 11;

The battery module 13 is located at a side of the input module away from the first surface, and the side of the battery module 13 provided with the charging coil 1331 faces a second surface of the device housing 11. The second surface may be opposite the first surface.

The charging coil 1331 can sense or receive the wireless signal, and convert the electromagnetic energy of the alternating magnetic field carried by the wireless signal into the electrical energy, e.g., converting into electrical energy of alternating current (AC) corresponding to the AC signal.

In some embodiments, the input module includes, but is not limited to: a touchpad, which is different from a touchscreen of a mobile phone, and the touchpad may be formed by a non-transparent and non-shielding touch panel that can detect the user's touch operation, and send the detected touch operation to the processing module of the electronic device, to control the implementation of various functions of the electronic device, thereby achieving the detection of the user input.

In other embodiments, the input module may further include: a keyboard or a touch bar other than the touch module. In short, in this embodiment, the input module is not limited to the touch panel.

In this embodiment, the disposition of the wireless charging coil at a position corresponding to the input module can reduce the shielding effect of the device housing 11 to the wireless charging coil, and can ensure the charging efficiency of the battery module 13.

In some embodiments, the charging coil 1331 may be a hollow ring-shaped charging coil 1331. The hollow portion of the annular charging coil 1331 is located at the side of the input module away from the first surface.

In this embodiment, the charging coil 1331 is the hollow ring-shaped charging coil 1331, and a ring body of the charging coil 1331 is formed outside the hollow ring. The ring body is formed by multiple loops of the charging coil 1331.

Accordingly, when the battery module 132 generates heat and expands, the middle part expands first relative to the two ends, and the charging coil is the ring-shaped hollow charging coil, so that the middle expanded part of the battery module 132 can enter the hollow part, and accordingly, does not push other components of the electronic device.

Figure 2:
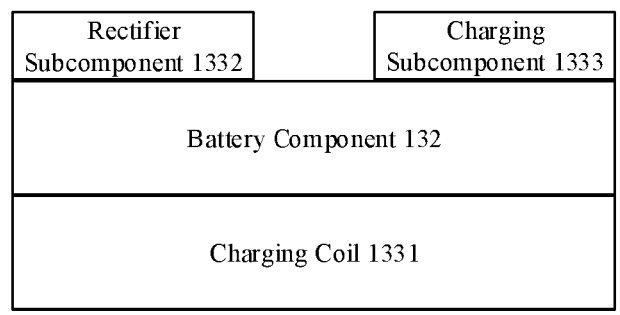
FIG. 2 is a schematic structural diagram of a charging module according to an embodiment of the present disclosure.

In some embodiments, as shown in FIG. 2, the charging component 133 may further include: a rectifier subcomponent 1332 connected to the charging coil 1331, being located at a side of the battery component 132 different from the charging coil 1331, and being configured to rectify the charging signal; a charging subcomponent 1333 connected to the rectifying subcomponent 1332, being located at the side of the battery component 132 different from the charging coil 1331, and being configured to transmit the rectified charging signal to the battery component 132 to charge the battery component 132.

In this embodiment, a first direction is a stacking direction of the battery component 132 and the charging component 133 in the battery module 13; and a second direction is perpendicular to the first direction.

The rectifier subcomponent 1332 and the charging subcomponent 1333 are located at opposite ends of the second direction of the input module.

The rectifier subcomponent includes one or more rectifiers, but not limited to full-bridge rectifiers or half-bridge rectifiers.

After the charging coil 1331 converts the wireless signal to the AC signal transmitted in the circuit, the AC signal can be converted into a DC signal capable of charging the battery component 132 by the rectifier sub-component.

The charging subcomponent 1333 is connected to a rear end of the rectifier subcomponent, and can process the rectified charging signal of the rectifier subcomponent through voltage transformation, etc., to supply to the battery component 132 for charging the battery component 132.

In this embodiment, the rectifier subcomponent 1332 and the charging subcomponent 1333 may generate heat due to the passage of current during the charging of the battery component 132. According to this embodiment, in order to reduce the concentrated arrangement of the rectifier subcomponent 1332 and the charging subcomponent 1333, which leads to the phenomenon of poor heat dissipation caused by heat accumulation, the rectifier subcomponent 1332 and the charging subcomponent 1333 can be disposed at different sides of the battery component 132. The different sides are that the charging component 133 and the battery component 132 are located at different sides in the stacking direction. In other words, the rectifier subcomponent 1332 and the charging subcomponent 1333 are located at different ends of the same side of the battery component 132.

In some embodiments, a spacing may be disposed between the charging subcomponent 1333 and the rectifying subcomponent 1332. The spacing can provide a larger space for the heat dissipation of the charging subcomponent 1333 and the rectifying subcomponent 1332 to a certain extent. Accordingly, on the one hand, the heat dissipation of the entire battery component 132 can be accelerated; on the other hand, compared to the heat accumulation caused by disposing the charging subcomponent 1333 and the rectifier subcomponent 1332 that can generate a considerable amount of heat on the same side of the battery component, the structure of the battery component in this embodiment can reduce the phenomenon of temperature differences at different locations being too large, thereby achieving a thermal balance of the entire battery module 13.

In this embodiment, the casing of the battery module may be a special-shaped casing, and specifically, a cross-section of the battery casing may be a concave shape, as shown in FIG. 3.

In addition, the rectifier subcomponent 1332 and the charging subcomponent 1333 are disposed on opposite sides of the charging coil 1331; that is, the rectifier subcomponent 1332 and the charging subcomponent 1333 are disposed close to the input module. Referring to FIG. 3, a protrusion portion of the input module toward the inside of the device housing may be embedded in the spacing between the rectifier subcomponent 1332 and the charging subcomponent 1333. As such, the rectifier subcomponent 1332 and the charging subcomponent 1333 are not separately disposed, so that the overall thickness of the electronic device can be reduced, and the electronic device can be made lighter and thinner.

In some embodiments, the charging component 133 may further include: a control subcomponent located in the second receiving cavity, being on the same side of the input module as the rectifier subcomponent 1332 in the second direction, and being configured to control the operating state of the charging subcomponent 1333.

The state of charging subcomponent 1333 includes, but is not limited to: a connected state of the charging subcomponent 1333; and a disconnected state of the charging subcomponent 1333.

If the charging subcomponent 1333 is in the connected state, the charging component 133 and the battery component 132 are connected, and the charging component 133 can charge the battery component 132 via the connection. If the charging subcomponent 1333 is in the disconnected state, the charging component 133 and the battery component 132 are disconnected, and the charging component 133 cannot charge the battery component 132.

The control subcomponent may include, but is not limited to: a charging controller; and may be connected to a controlled switch that is disposed at the charging subcomponent 1333, and may provide a control signal to the controlled switch to control the state of the charging subcomponent 1333. For example, the controlled switch includes but is not limited to: one or more metal-oxide-silicon (MOS) transistors.

In some embodiments, the heat dissipation of the battery module 13 can be achieved by heat exchange with gases such as the air.

In other embodiments, the heat of the battery module 13 can also be dissipated by liquid cooling. For example, a liquid cooling component containing a cooling liquid may be provided in or around the battery module 13 and a liquid cooling medium (e.g., water) can exchange heat with the battery module 13 for heat dissipation.

In this embodiment, the rectifier subcomponent 1332 and the charging subcomponent 1333 are spaced apart. Since the rectifier subcomponent 1332 and the charging subcomponent 1333 are spaced apart, a contact area between the rectifier subcomponent 1332 and the charging subcomponent 1333 and the surrounding can be larger, thereby increasing the heat dissipation area, so that the heat dissipation can be accelerated. In addition, this separate arrangement can be more favorable to achieving the thermal balance of the entire battery module 13 than the concentrated arrangement in the battery module 13.

In some embodiments, the battery module 13 further includes: a heat dissipation component distributed on different sides in the first direction of the battery component 132 from the rectifier subcomponent 1332 and the charging subcomponent 1333 for the heat dissipation of the battery module 13.

The heat dissipation component, and the high-heat-generating rectifier subcomponent and charging sub-assembly 1333 are located at different sides in the stacking direction, and can utilize high thermal conductivity of the heat dissipation component to transfer heat to the other side to achieve rapid heat dissipation.

In some embodiments, the heat dissipation component may also be wrapped on multiple sides of the battery component 132 and the charging component 133 to achieve rapid heat conduction and heat dissipation.

Figure 4A:
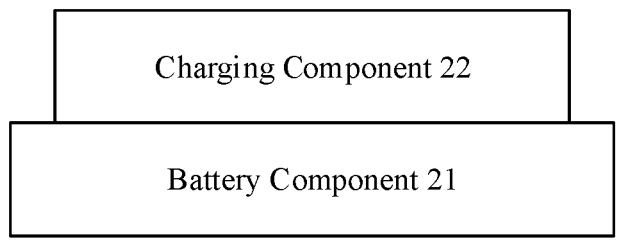
FIG. 4A illustrates a cross-sectional view of a battery module according to an embodiment of the present disclosure.
Figure 4B:
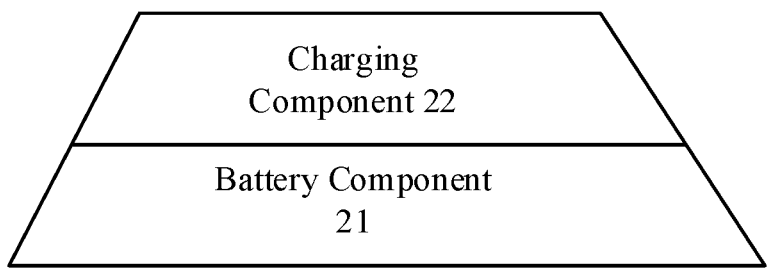
FIG. 4B illustrates another cross-sectional view of the battery module according to an embodiment of the present disclosure.
Figure 4C:
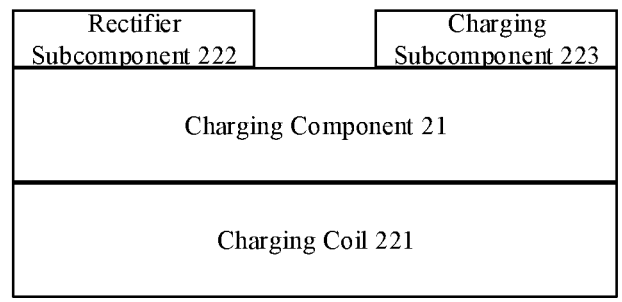
FIG. 4C illustrates a cross-sectional view of another battery module according to an embodiment of the present disclosure.

As shown in FIGS. 4A, 4B, and 4C, this embodiment provides a battery module, including: a battery component 21 configured to store electrical energy or release the stored electrical energy; and a charging component 22 connected to the battery component 21, being configured to charge the battery component 21 through wireless signal transmission with a power supply device. The battery module has at least two thicknesses in the stacking direction of the battery component 21 and the charging component 22. The battery component 21 includes one battery or a battery pack. The charging component 22 is a charging structure capable of charging based on a wireless signal as provided in the foregoing embodiment.

In this embodiment, the battery component 21 and the charging component 22 are stacked, and cross-sections of the battery component 21 and the charging component 22 in the stacking direction have a height difference, which indicates that the battery module is not in a regular or standard shape. For example, the battery module is no longer a standard rectangle, but a specific shaped battery module. In short, the battery module provided in this embodiment forms an entirety. Accordingly, the replacement of the battery module can be more convenient, and the electronic device that could not be charged based on the wireless signal can be simplified, and the battery that could not be charged based on the wireless signal is replaced with the battery module that can be charged based on the wireless signal according to this disclosure, which achieves a simple replacement of the battery module in the electronic device. Accordingly, the overall battery module can have at least two thickness differences in the stacking direction, which can coincide with the internal protrusion of the electronic device, so that the overall thickness of the electronic device can be reduced, compared to the entire battery module with no height difference.

In some embodiments, due to the at least two thicknesses, the cross-section of the battery module has a stepped shape, a trapezoidal shape, or a concave shape with wide ends and a narrow middle part.

Referring to FIG. 4C, the charging component 22 includes: a rectifier subcomponent 222 located at a first end of a first side of the battery component 21; and a charging subcomponent 223 located at a second end of the first side of the battery component 21. The second end and the first end are opposite, and there is a spacing between the charging subcomponent 222 and the rectifier subcomponent 222.

The cross-section of the battery module has a first thickness at a position having the spacing.

The cross-section of the battery component 21 has a second thickness at a position other than the spacing. The second thickness is different from the first thickness.

In some embodiments, the battery module may further include: a battery casing formed with a receiving cavity for receiving the battery component 21 and the charging component 22.

The rectifier subcomponent 222 is connected to a wireless charging coil 221, being located at a different side of the battery component 21 from the wireless charging coil 221, and being configured to rectify the charging signal.

The charging subcomponent 223 is connected to the rectifying subcomponent 222, being located at different side of the battery component 21 from the wireless charging coil 221, and being configured to transmit the rectified charging signal to the battery component 21 to charge the battery component 21.

The rectifier subcomponent 222 and the charging subcomponent 223 are located at opposite ends of the battery component 21.

In short, referring to FIG. 4C, the charging coil 221 and the charging subcomponent 223 are located at different sides of the charging component 22 and the battery component 21 in the stacking direction.

In some embodiments, the battery module may further include: a connection interface capable of being wired to the function module to provide the electrical energy stored in the battery component 21 to the function module.

The function module may be various modules in an electronic device that can generate power consumption.

According to an embodiment of the present disclosure, if the circuit board and the charging coil directly are simply stacked on the main board, the thickness of the entire device may be increased. Moreover, there may be interference between the wireless charging portion and the circuit of the main board, and the problem of the EMI, RFI, and heat dissipation need to be solved.

The solution in the embodiments of the present disclosure adds the wireless charging module to the battery pack, and upgrades an electronic device without a wireless charging function to an electronic device with a wireless charging function by utilizing the existing space of the notebook and only replacing the battery, without increasing the thickness of the electronic device (e.g., notebook (NB)) and reducing the battery capacity.

With this design, the wireless charging part and the main board can also be spaced apart which makes the main board design simple, and there is no need to consider the heat dissipation and interference problems since these problems can be solved with the battery design.

In the current design of the notebook, there is a 3 mm space between C covers on both sides of the touch panel and the battery, but the touch surface part in the middle is in contact with the battery. Because the battery is flat, the space on both sides cannot be used. Accordingly, the added wireless charging receiver (Rx) and battery charger boards can be placed on both sides, between the battery core and the C covers.

The wireless charging Rx and battery charger boards can be placed on both sides of the touch panel for thermal balance. Furthermore, the components face the battery, utilize an aluminum sheet at a bottom of the battery pack to dissipate heat, and reduce the temperature rise of the C cover of the electronic device as much as possible to dissipate heat through a D Cover so that the temperature of the C cover with higher probability of contacting the user's hand can be decreased.

Figure 5:
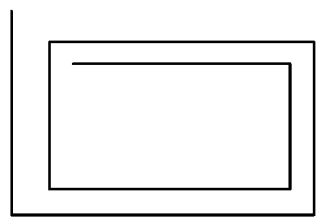
FIG. 5 is a schematic diagram of a charging coil according to an embodiment of the present disclosure.

The charging coil for the wireless charging may be a flexible printed circuit board (FPC)+ferrite, which is placed on the battery between the battery and the D cover, and the signal cannot be shielded by the battery. The charging coil may be connected through a flexible circuit board (FPC), and printed circuit board assembly (PCBA) on both sides, which correspond to the circuit board where the aforementioned wireless charging Rx and battery charger are located. The charging coil can be placed by taking advantage of the reserved expansion space of the battery. By adoption of Airfuel's wireless charging technology, only the edge of the charging coil may be wound, and the middle can be hollowed out. The battery expansion is mainly in the center, and the edge does not expand. Therefore, there is no need to increase the thickness of the electronic device for the charging coil. FIG. 5 is a schematic diagram of the hollow charging coil.

Figure 6:
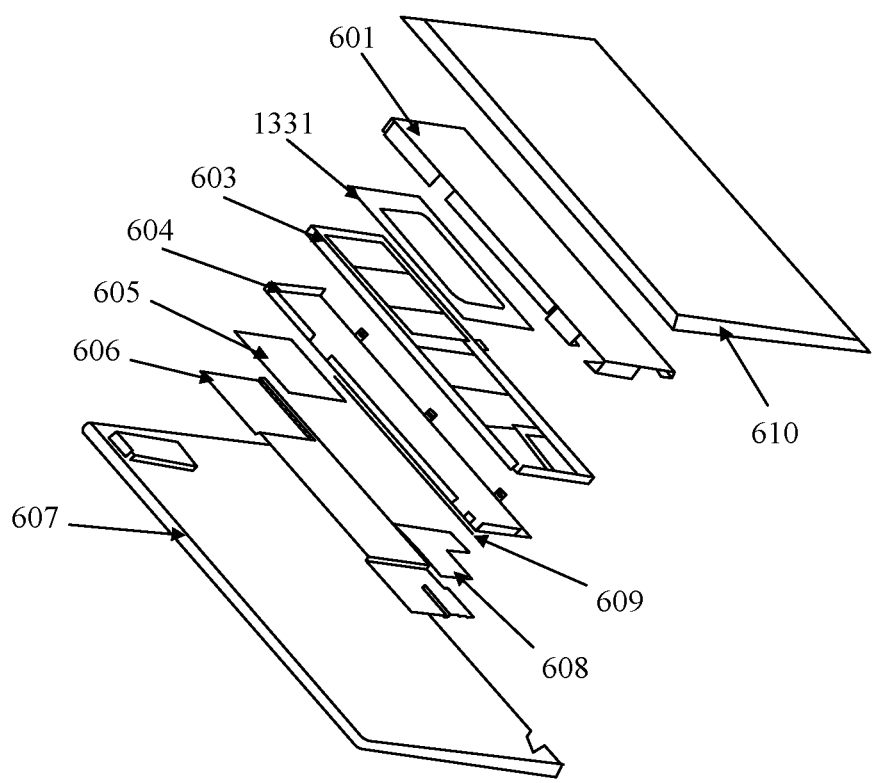
FIG. 6 illustrates a stack view of the electronic device according to an embodiment of the present disclosure.

As shown in FIG. 6, an embodiment of the present disclosure provides an electronic device, including: a rear housing of electronic device 610; a front housing of electronic device 607; a battery pack 603 corresponding to the aforementioned battery component; a charging coil 1331; a rectifier 605 corresponding to the aforementioned rectifier subcomponent; a charger 608 corresponding to the aforementioned charging subcomponent; a battery front casing 601; a battery rear casing 606; a connection wire 609 configured to connect the battery pack 603 and the charger 608; and a supporting member 604.

Figure 7:
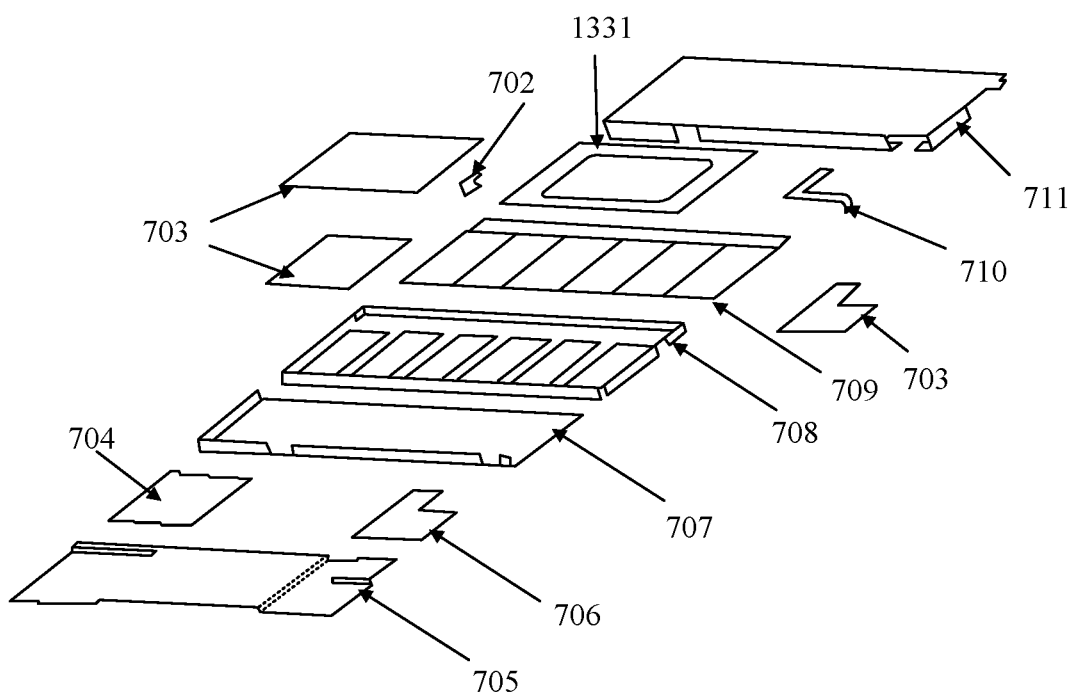
FIG. 7 illustrates an exploded view of the electronic device in FIG. 6.

According to this embodiment, an exploded view of the electronic device in FIG. 6 is illustrated in FIG. 7. As shown in FIG. 7, the electronic device includes a charging coil 1331, a first flexible board connector (FBC) 702, a polyester film 703, a rectifier 704, a battery rear casing 705, a charger 706, a supporting member 707, a frame 708, a printed circuit board (PCB) 709, a second FBC 710, and a battery front casing 711. The polyester film 703 may be, for example, a Mylar film. The PCB 709 includes a battery cell, and the frame 708 and the PCB 709 can form the battery pack 603 as shown in FIG. 6.

In the several embodiments provided in the present disclosure, it should be understood that the disclosed device and method may be implemented in other manners. The device embodiments described above are only schematic. For example, the division of the units may be only a logic function division, and in actual implementation, there may be another division manner. For example, multiple units or components may be combined, or may be integrated into another system, or some features can be ignored or not implemented. In addition, the coupling or direct coupling or communication connection between the displayed or discussed components may be through some interfaces, and the indirect coupling or communication connection of the device or unit may be electrical, mechanical, or in other forms.

The above-mentioned units described as separate components may or may not be physically separate, and the components displayed as units may or may not be physical units; that is, they may be located in one place or distributed to multiple network units. Some or all of the units may be selected according to actual needs to achieve the purpose of the solution of this embodiment.

In addition, the functional units in the embodiments of the present disclosure may all be integrated into one processing module, or each unit may be separately used as a unit, or two or more units may be integrated into one unit. The above integrated unit can be implemented in the form of hardware, or in the form of hardware plus software functional units.

Those of ordinary skill in the art may understand that all or part of the steps to implement the above method embodiments may be completed by program instruction related hardware. The foregoing program may be stored in a computer-readable storage medium, and when the program is executed, the steps of the above method embodiments can be performed. The foregoing storage medium includes: mobile storage devices, read-only memory (ROM), random-access memory (RAM), various mediums that can store program codes such as magnetic disks or optical disks.

The above is only the specific implementation of the present disclosure, but the scope of the disclosure is not limited to this, and variations or substitutions that any person skilled in the art can easily think within the technical scope disclosed in the present disclosure should be covered by the scope of the disclosure. Therefore, the scope of the disclosure shall conform to the scope of the claims.

What is claimed is:

1. An electronic device, comprising:
   a device housing having a first receiving cavity,
   a function module at least partially located in the first receiving cavity, and
   a battery module located in the first receiving cavity;
   wherein the battery module comprises:
      a battery casing, the battery casing forming a second receiving cavity;
      a battery component located in the second receiving cavity, being configured to store electrical energy or release the stored electrical energy; and
      a charging component located in the second receiving cavity, being connected to the battery component and being configured to charge the battery component through transmission of a wireless signal with a power supply device,
   wherein:
   the charging component comprises:
      a charging coil configured to induce the wireless signal, convert the wireless signal into a charging signal, and charge the battery component based on the charging signal;
   the function module comprises:
      an input module, comprising: an input collection area displayed on an outer surface of the electronic device through an opening disposed on a first surface of the device housing; and
   the battery module is located at a side of the input module away from the first surface, and a side of the battery module provided with the charging coil faces a second surface of the device housing, the second surface being opposite the first surface.

2. The electronic device according to claim 1, wherein: the charging coil is a hollow ring-shaped charging coil, and the hollow portion of the ring-shaped charging coil is located away from the side of the first surface of the input module.

3. The electronic device according to claim 1, wherein the function module comprises:
   a charging component, comprising:
      a rectifier subcomponent connected to the charging coil, being located at a different side of the battery component from the charging coil in a first direction, and being configured to rectify the charging signal; and
      a charging subcomponent connected to the rectifier subcomponent, being located at a different side of the battery component from the charging coil, and being configured to transmit the rectified charging signal to the battery component to charge the battery component; wherein:
      the rectifier subcomponent and the charging subcomponent are located at opposite ends of the input module in a second direction, the second direction being perpendicular to the first direction.

4. The electronic device according to claim 1, wherein the input module comprises at least one of: a keyboard, a touchpad, a touchscreen, a fingerprint module, and pointing stick.

5. The electronic device according to claim 1, wherein:
when the battery module generates heat and expands, a middle part expands first relative to two ends, the charging coil being a ring-shaped hollow charging coil, and the middle part entering the hollow part during expansion.

6. The electronic device according to claim 1, wherein:
a state of the charging subcomponent comprises: a connected state and a disconnected state;
when the charging subcomponent being in the connected state, the connected charging subcomponent charging the battery component; and
when the charging subcomponent being in the disconnected state, the charging subcomponent not charging the battery component.

7. The electronic device according to claim 3, wherein the charging component further comprises:
a control subcomponent located in the second receiving cavity, being located at the same side of the input module as the rectifier subcomponent in the second direction, and being configured to control operating state of the charging subcomponent.

8. The electronic device according to claim 7, wherein:
the control subcomponent comprises: a charging controller; and
the control subcomponent is connected to a switch; the switch being controlled by the control subcomponent and being disposed at the charging subcomponent, and being configured to provide a control signal to the switch to control a state of the charging subcomponent, the switch comprising: one or more metal-oxide-silicon (MOS) transistors.

9. The electronic device according to claim 3, wherein:
a spacing is disposed between the rectifier subcomponent and the charging subcomponent; and
the battery module comprises:
a heat dissipation component distributed on a different side of the battery component from the rectifier subcomponent and the charging subcomponent in the first direction, and being configured to dissipate heat of the battery module.

10. The electronic device according to claim 9, wherein:
a protrusion portion of the input module toward an inside of the device housing is embedded in the spacing between the rectifier subcomponent and the charging subcomponent.

11. A battery module, comprising:
a battery component configured to store electrical energy or release the stored electrical energy; and
a charging component, connected to the battery component, being configured to charge the battery component through transmission of a wireless signal with a power supply device;
the battery module having at least two thicknesses in a stacking direction of the battery component and the charging component,
wherein the charging component comprises:
a rectifier subcomponent located at a first end of a first side of the battery component; and
a charging subcomponent located at a second end of the first side of the battery component, the second end being opposite the first end; and a spacing being disposed between the charging subcomponent and the rectifier subcomponent, a cross-section of the battery component at a position including the spacing having a first thickness, a cross-section of the battery component at a position other than the spacing having a second thickness, the second thickness being different from the first thickness.

12. The battery module according to claim 11, wherein the battery module has a shape from one of: a stepped shape, a trapezoidal shape, or a concave shape having wide ends and a narrow middle part, due to the at least two thicknesses.

13. A battery module, comprising:
a battery component configured to store electrical energy or release the stored electrical energy;
a charging component, connected to the battery component, being configured to charge the battery component through transmission of a wireless signal with a power supply device, the battery module having at least two thicknesses in a stacking direction of the battery component and the charging component,
a battery casing having a receiving cavity configured to receive the battery component and the charging component;
a charging coil located in the receiving cavity, being configured to: induce the wireless signal, convert the wireless signal into a charging signal, and charge the battery component based on the charging signal;
a rectifier subcomponent connected to the wireless charging coil, being located at a different side of the battery component from the wireless charging coil, and being configured to rectify the charging signal; and
a charging subcomponent connected to the rectifier subcomponent, being located at the different side of the battery component from the wireless charging coil, being configured to transmit the rectified charging signal to the battery component to charge the battery component, the rectifier subcomponent and the charging subcomponent being located at opposite ends of the battery component.

14. The battery module according to claim 11, wherein:
the battery module dissipates heat to surrounding air or a cooling liquid contained in a cooling component.

15. The battery module according to claim 11, further comprising:
a connection interface capable of being connected to a function module and supplying the stored electrical energy of the battery component to the function module.

* * * * *